United States Patent [19]
Sasagaki et al.

[11] Patent Number: 5,500,711
[45] Date of Patent: Mar. 19, 1996

[54] CAMERA EQUIPPED WITH WARNING FUNCTION AND METHOD

[75] Inventors: Nobuaki Sasagaki; Takashi Saegusa, both of Kanagawa, Japan

[73] Assignee: Nikon Corporation, Tokyo, Japan

[21] Appl. No.: 377,604

[22] Filed: Jan. 25, 1995

[30] Foreign Application Priority Data

Feb. 4, 1994 [JP] Japan ..................... 6-013028

[51] Int. Cl.⁶ ............................... G03B 17/18
[52] U.S. Cl. ........................................ 354/474
[58] Field of Search ..................... 354/468, 471, 354/474, 475

[56] References Cited

U.S. PATENT DOCUMENTS

| 5,142,320 | 8/1992 | Nakano et al. | 354/471 |
| 5,191,373 | 3/1993 | Nakano | 354/474 |
| 5,218,399 | 6/1993 | Izumi et al. | 354/471 |
| 5,434,642 | 7/1995 | Sasagaki | 354/471 |

FOREIGN PATENT DOCUMENTS

| 4-81731 | 3/1992 | Japan . |
| 4-81732 | 3/1992 | Japan . |
| 4-81733 | 3/1992 | Japan . |
| 4-81734 | 3/1992 | Japan . |

*Primary Examiner*—W. B. Perkey
*Attorney, Agent, or Firm*—Oliff & Berridge

[57] ABSTRACT

A camera on which warnings of serious content and warnings of relatively insignificant content are organized and displayed, and on which warning contents are easily understandable, even to an inexperienced photographer. When a condition requiring a warning is detected as a result of camera monitoring, a camera controller performs a procedure that displays an appropriate warning on the display device. If the warning content concerns a condition that has been determined in advance to be serious, the warning is displayed without regard to the current display content. If the warning concerns a condition that is relatively insignificant, the warning is displayed only in conditions in which specific functions have been selected.

30 Claims, 12 Drawing Sheets

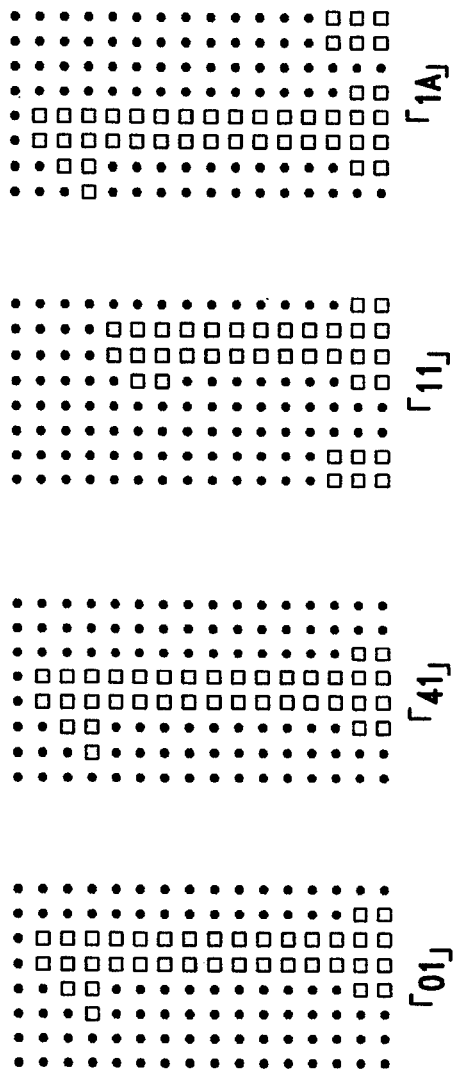
FIG.5
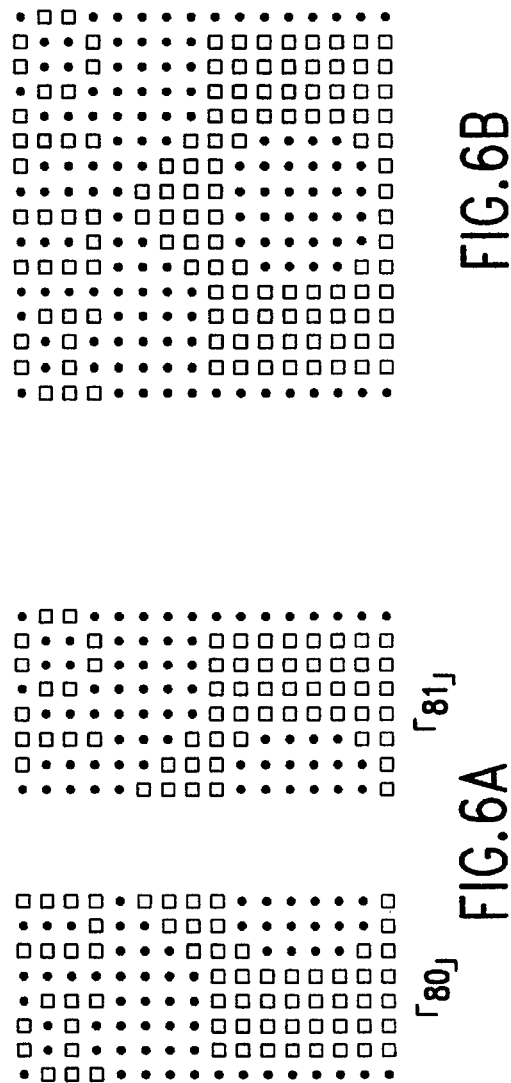
FIG.6A
FIG.6B

|   | 00 | 10 | 20 | 30 | 40 | 50 | 60 | 70 | 80 | 90 | A0 | B0 | C0 | D0 | E0 | F0 |
|---|---|---|---|---|---|---|---|---|---|---|---|---|---|---|---|---|
| 0 | 0 | .0 |   | P | 0 | p | . |   | ŏ | P | ⇐ | ŏ | A | ☼ | ⚠ |   |
| 1 | 1 | .1 | A | Q | 1 | q | . |   | ŏ | P | ⇐ | ŏ | A | ☼ | ⚠ |   |
| 2 | 2 | .2 | B | R | 2 | r | • |   | ▲ | S | ⇒ | ♛ | ↯ | ひ | ? |   |
| 3 | 3 | .3 | C | S | 3 | s | • |   | ▲ | S | ⇒ | ♛ | ↯ | ひ | ? |   |
| 4 | 4 | .4 | D | T | 4 | t | ✦ |   | ⚡ | A | DX | — | ⛨ | ▭ |   |   |
| 5 | 5 | .5 | E | U | 5 | u | - |   | ⚡ | A | DX | — | ⛨ | ▭ |   |   |
| 6 | 6 | .6 | F | V | 6 | v | ± |   | ✿ | M | ⛫ | ⏊ | ⚑ | ▭ |   |   |
| 7 | 7 | .7 | G | W | 7 | w | ✱ |   | ✿ | M | ⛫ | ⏊ | ⚑ | ▭ |   |   |
| 8 | 8 | .8 | H | X | 8 | x | ‹ |   | ⚒ | 🖀 | ½ | ⬆ | ⛺ | ▬ |   |   |
| 9 | 9 | .9 | I | Y | 9 | y | › |   | ⚒ | 🖀 | ½ | ⬆ | ⛺ | ▬ |   |   |
| A | 0 | 1. | J | Z | 0 | z | = |   | ⚔ | 🖀 | ⊙ | N | ⊙ |   |   |   |
| B |   |   | K |   | k |   | : |   | ⚔ | 🖀 | ⊙ | N | ⊙ |   |   |   |
| C |   |   | L |   | l |   | / |   | ER | ISI | S | 🏭 | ⚔ | En |   |   |
| D |   |   | M |   | m |   | ? |   | ER | ISI | S | 🏭 | ⚔ | En |   |   |
| E |   |   | N |   | n |   | ! |   | ⛿ | ⚠ | C | 🏭 | AF | ⚥ | ▦ |   |
| F |   |   | O |   | o |   | ❚ |   | ⛿ | ⚠ | C | 🏭 | AF | ⚥ | ▦ |   |

FIG. 13

CAMERA EQUIPPED WITH WARNING FUNCTION AND METHOD

This application is directed to subject matter that is related to subject matter in other co-pending U.S. Patent Applications (Our Refs: JAO 32104 entitled "Display System and Method for a Camera," JAO 32109 entitled "Camera Equipped With Warning Function and Method," JAO 32110 entitled "Camera for Selectively Inputting Operating Parameters and Method," JAO 32111 entitled "Camera Input and Display Device With Timer and Method," JAO 32112 entitled "Camera With Film Sensitivity Setting Function and Method," JAO 32113 entitled "Camera Display System and Method," JAO 32114 entitled "Camera and Method for Assuring Photography With Selected Parameter," and JAO 32115 entitled "Camera With Simplified Parameter Selection and Dual Mode Operation and Method of Operation"), filed simultaneously herewith by the same inventors, which are all hereby incorporated by reference.

BACKGROUND OF THE INVENTION

1. Field of the Invention

The present invention relates to a camera with which special functions are possible by selecting parameters, the camera monitoring camera conditions and displaying various warnings.

2. Description of Related Art

In recent years, cameras have been equipped with computers that allow many functions. For example, automatic focus adjusting (AF) devices, automatic exposure (AE) devices, and the like are presented as representative examples of available functions. There are also various monitoring devices for film sensitivity setting, film frame number detection, and camera shake warning.

Along with this shift to many functions and monitoring of various information, it has become necessary to display information for the setting of various parameters relating to automatic exposure, information for the setting of various parameters relating to automatic focus adjustment, monitoring of information, and the like. Therefore, on recent cameras, devices provided with liquid crystal displays or the like have been introduced.

Japanese Unexamined Utility Model Application No. 3-42141 is an example of such a device. This technology relates to a camera display device that displays photographic information relating to a camera on the body of the camera. A dot LCD (liquid crystal display component) is used in the display. In addition, the display component is divided into multiple regions, each region being provided with a divided display that displays subtitle information, an entire body display that displays specific information on the above-mentioned display component, a subtitle information selecting device that selects one of the pieces of subtitle information displayed by the divided display, and a field switching device that displays the information positioned at the bottom of the selected subtitle information in the display component via the above-mentioned entire body display when one of the pieces of subtitle information have been selected. The photographer operates a switch while viewing this displayed subtitle information until the desired title is displayed. When the desired title is displayed in one of the divided regions, the photographer operates the operating switch that corresponds to each region for which the title is to be selected. When a subtitle is selected in this manner, the information at the bottom position of the subtitle information is displayed on the display component by the field switching device via the entire body display.

The cameras of recent years carry out various monitoring procedures with computers. When some abnormality occurs, a display indicates the abnormality and makes it known to the photographer. However, according to the conventional technology described above, many pieces of information are displayed by subtitles, from which selection is made. Not much thought has been given to making the warning displays from the camera to the photographer easy to see or easy to understand.

As a specific problem, in conditions in which a warning is given, there are cases in which the desired photograph cannot be obtained even though a photograph is taken. On the other hand, there are warnings given which, even if ignored, do not present a problem to photography. In addition, when unique effects are desired, there may be cases in which a warning is ignored. Thus, it is necessary for the photographer to accurately understand the content of a warning.

In particular, since recent multi-function and high performance cameras carry out various monitoring procedures by means of a computer, there are many different conditions that can require warnings. It is thus unreasonable for a photographer to have to remember all these conditions and the methods of dealing with these conditions. This is particularly difficult for beginners. It is therefore desirable to arrange the contents on the camera display and to carry out the warnings in an easily understandable fashion.

There are cases in which, when a warning is displayed, the current display contents disappear or in which a portion of the display disappears. However, if the contents of the displayed warning are relatively unimportant, there are times at which the photographer wishes to go ahead and execute the current photograph. In these cases, according to the warning, it may be undesirable for the information to become unreadable. Conventionally, no particular consideration has been given to these circumstances.

SUMMARY OF THE INVENTION

The present invention has been conceived to resolve these types of problems, and has an object of providing a camera capable of regulating and displaying both warnings with serious contents and warnings that are not serious, and of making the display such that even an inexperienced photographer can easily understand the contents of warnings.

Another object of the present invention is to provide a camera that can display warnings in a manner that will not, insofar as is possible, hinder the photography of the photographer by changing the display according to whether or not the warning content is serious.

Still another object of the present invention is to provide a user friendly camera on which information relating to the necessary setting parameters can be easily seen, and on which the input operations for setting these parameters can be easily carried out.

In order to accomplish the above-mentioned objects, the present invention provides a camera equipped with a warning function that can select a target parameter from among multiple parameters that have been prepared in advance, comprising a display device with a dot matrix display component; and a controlling device for controlling the action of the camera. The controlling device performs a number of procedures: a procedure which, at a minimum, displays a first display screen on the display device showing multiple parameter selection branches for carrying out parameter selection and displays a second display screen when a particular parameter has been selected and confirmed; a procedure that monitors the action of each of several camera components; and a procedure which, when the result of the camera monitoring reveals a condition that requires a warning, causes a warning display to be shown on the display device showing the content of the appropriate warning.

If the warning relates to a condition that has been determined in advance to be a serious condition, the warning is displayed in both the first and second display screens. If the warning relates to a condition that is not serious, the warning is displayed only in the second display screen condition.

The dot matrix display component can have multiple display blocks. The controlling device controls the dot matrix display component so that at least the first display screen shows selection branches for carrying out parameter selection in the display blocks and controls display of the second display screen when a particular parameter has been selected and confirmed. In this case, the controlling device can control the second display screen to be displayed in one or more display blocks of the dot matrix display component.

The controlling device can issue and display warnings for conditions that are not serious using display blocks that are not used in the second display.

The controlling device can display icons that indicate which parameters may be selected as selection branches in each display block of the dot matrix display component for the first display screen and can display an icon for the selected parameter in one of the display blocks for the second display screen. In this case, when the warning is for a condition that is not serious, the controlling device uses a display block for the appropriate warning icon that has not been used in the second display.

The controlling device has a memory component that records character patterns for displaying icons for parameters that may be selected and character patterns for displaying other warning symbols or icons.

Since the display device with a dot matrix display component can display a pattern with dots, any arbitrary pattern can be displayed. Therefore, by recording patterns in advance, various displays can be carried out.

In addition, with a camera according to the present invention, the controlling device controls the display of at least a first display screen on the display device that shows multiple selection branches for carrying out parameter selection and a second display screen for when parameters have been selected and confirmed. Thus, the selection of various parameters and whether or not conditions exist for which the parameters have been selected may be clearly distinguished on the display, enabling the photographer to clearly recognize the existing conditions.

Also, with the present invention, the controlling device monitors each operation of the camera. If a condition is detected as a result of this monitoring that requires a warning, a warning display is carried out on the display device showing the appropriate warning content.

When the warning relates to a condition that has been determined in advance to be serious, the warning is displayed in both the first and second display screens.

Conversely, if the warning is for a condition that is not serious, the warning is displayed only in the second display screen. Thus, the photographer can easily distinguish between serious warnings that will present obstacles to photography and warnings that are not serious. In other words, when warnings of serious content and of not serious content are arranged and displayed, even an inexperienced photographer can easily understand the content of the warnings.

In addition, by changing the display according to whether the warning content is serious, warnings can be displayed in a manner that will not, insofar as is possible, hinder the photography of the photographer.

Furthermore, information relating to the necessary setting parameters can be easily seen, and the input operations for setting these parameters can be easily carried out.

BRIEF DESCRIPTION OF THE DRAWINGS

The invention will now be described in detail with reference to the following drawings.

FIG. 5 is an explanatory drawing that shows the arrangement of numerical patterns in the display blocks of the dot matrix display component used with the present embodiment.

FIG. 6A and 6B are explanatory drawings that show an example of the display pattern of the selection branches of the parameter selection in the display blocks of the dot matrix display component used with the present embodiment.

FIG. 13 is an explanatory drawing that shows an example of display patterns stored in the pattern generator used in the present embodiment.

DETAILED DESCRIPTION OF PREFERRED EMBODIMENTS

Embodiments of the present invention is described hereafter, with reference to the drawings.

Figure 1:
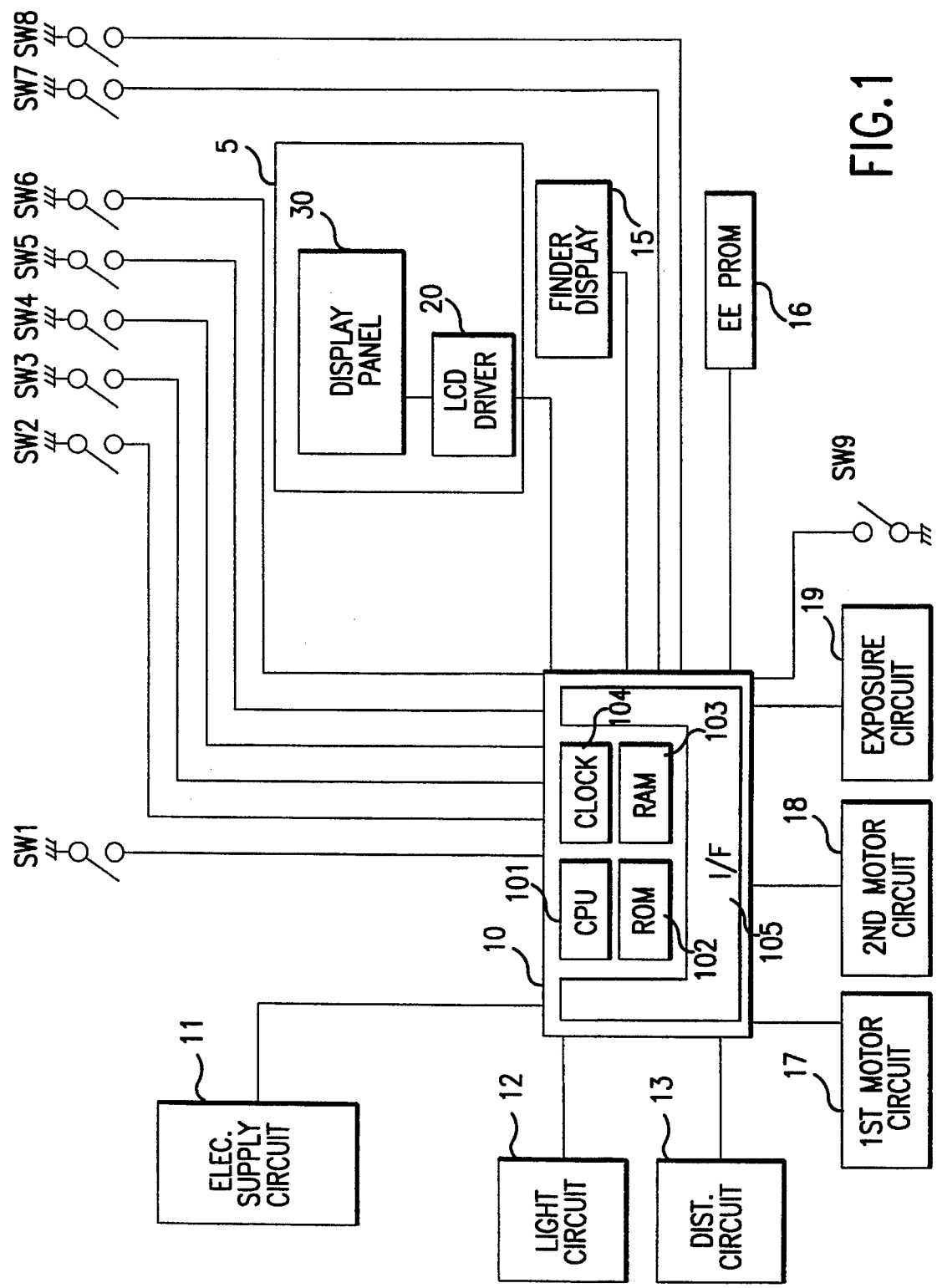
FIG. 1 is a block diagram that shows the structure of an embodiment of a camera that applies to the present invention.
Figure 2:
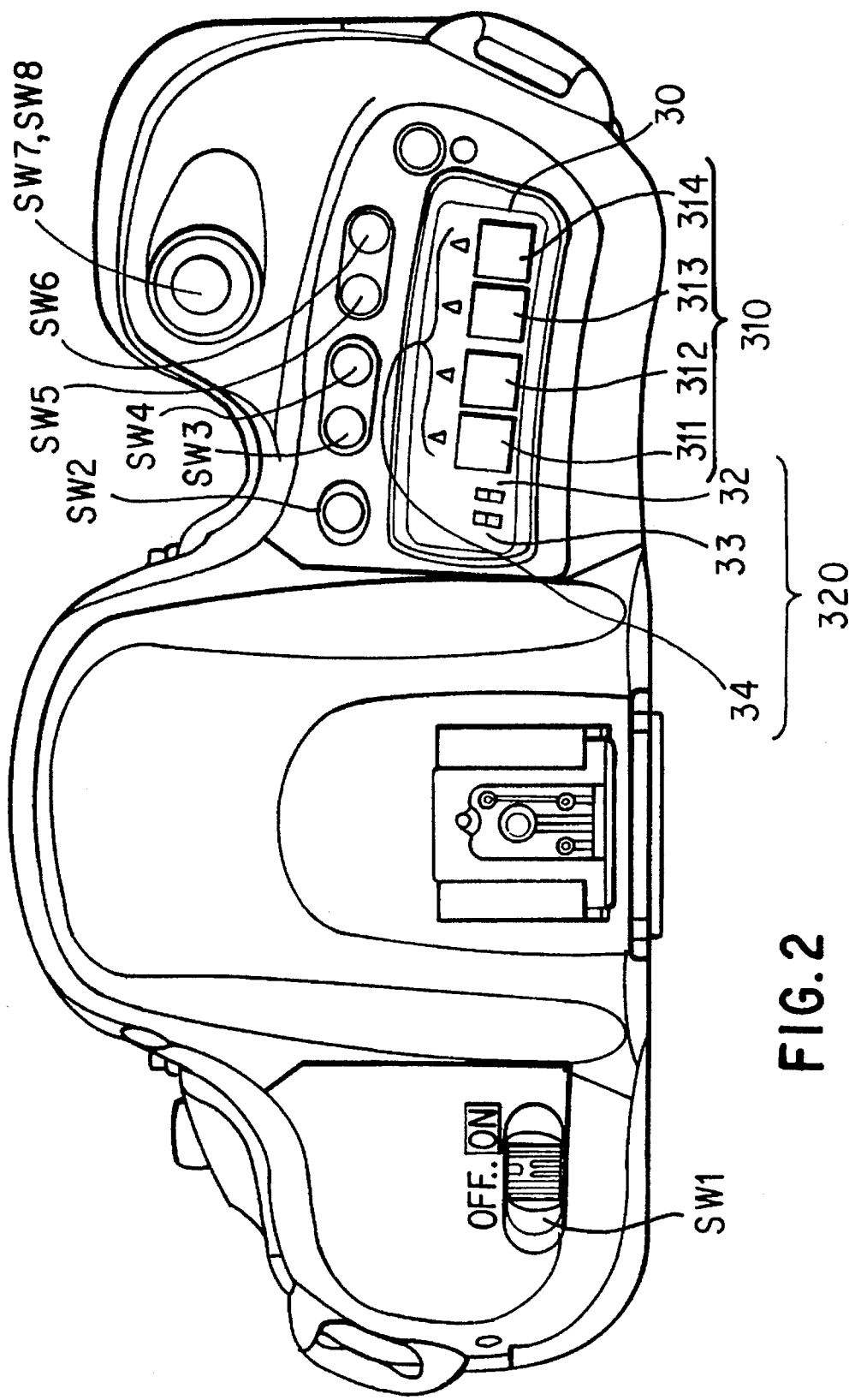
FIG. 2 is a front view that shows the external appearance of a camera that applies to the present invention.

An example of the structure of the hardware system of an embodiment of the camera of the present invention is shown in FIG. 1. An example of the external appearance of the front surface of the body of an embodiment of a camera of the present invention is shown in FIG. 2.

The embodiment shown in FIG. 1 comprises a display device 5 for carrying out the display of information from the camera to the photographer and a controlling device (MCU) 10 for controlling and monitoring the operations of the camera. A light measuring circuit 12 for carrying out photo metering, a distance measuring circuit 13 that measures distances, a first motor controlling circuit 17, a second motor controlling circuit 18, an exposure controlling circuit 19, an EEPROM (read only memory that may be written over and changed) 16 that functions as a memory device for recording parameter data and the like, and a finder display component 15 are connected to the controlling device 10. The controlling device 10 controls the operations of these circuits and devices and also monitors the actions through the control process. Obviously, it is acceptable to install sensors (not shown) and to monitor the operations of the camera by including the information from these sensors.

An electrical supply circuit 11 provides electric power to the display device 5, the controlling device 10, and the like. The first motor controlling circuit 17 controls the action of a motor that drives the lens. Specifically, the zoom action and the focus action are mentioned. The second motor controlling circuit 18 controls the action of a motor that raises and lowers the mirror and drives the film feeder. The exposure controlling circuit 19 controls the diaphragm, shutter, light adjustment, and the like.

The display device 5 has a display panel 30 that is positioned at the right side of the top surface of the body 1 and an LCD driver 20 that drives the display panel 30 and that is positioned inside the body 1, the display panel 30 on the present embodiment being constructed using a liquid crystal display panel, and a dot matrix display component 310 and a segmented displayed component 320 being constructed according to the positioning of the electric poles.

As shown in FIG. 4 (4a), the dot matrix display component 310 has multiple display blocks 311, 312, 313 and 314. which are positioned in a horizontal line. These display blocks 311–314 comprise dot matrix display units 31a–31h which carry out an em-size display (16 vertical× 16 horizontal dots). The term "em" describes the column width of the display. An "em" is the space occupied by an "M" in pica-size type. Each display block 311–314 has a column width equal to an "em" pica.

Each display block consists of two display block units. The display block units 31a–31h each comprise pixels of 16 vertical×8 horizontal dots. Each display block unit is one-half of an em-pica, in other words, enpica size. Thus, the dot matrix display block units 31a–31h make up display blocks 311–314, respectively forming adjacent pairs (31a and 31b), (31c and 31d), (31e and 31f), and (31g and 31h), each display component 311–314 being positioned in a horizontal line, with a fixed space between them. By placing a space between each display block in this manner, an easily readable display is possible. In particular, when icons showing the selection branches are arranged in multiple fashion and there is a space, it is easy to distinguish where the icons end and confusion is avoided. Specifically, when a warning is displayed, since the pattern is not a familiar one, the warning pattern will not be confused with another pattern.

With the present embodiment, on the dot matrix display component 310, the electric poles are not positioned in the spaces between display blocks 311, 312, 313 and 314. However, the structure may be such that the electric poles are positioned in the spaces. In this case, blanks should be displayed in the space regions.

With the present embodiment, the display block units are constructed of pixels of 16 vertical×8 horizontal dots, but the present invention is not limited to this configuration. For example, the units can be constructed from m×n squares, with m as 24 and n as 16, for example.

Figure 4A:
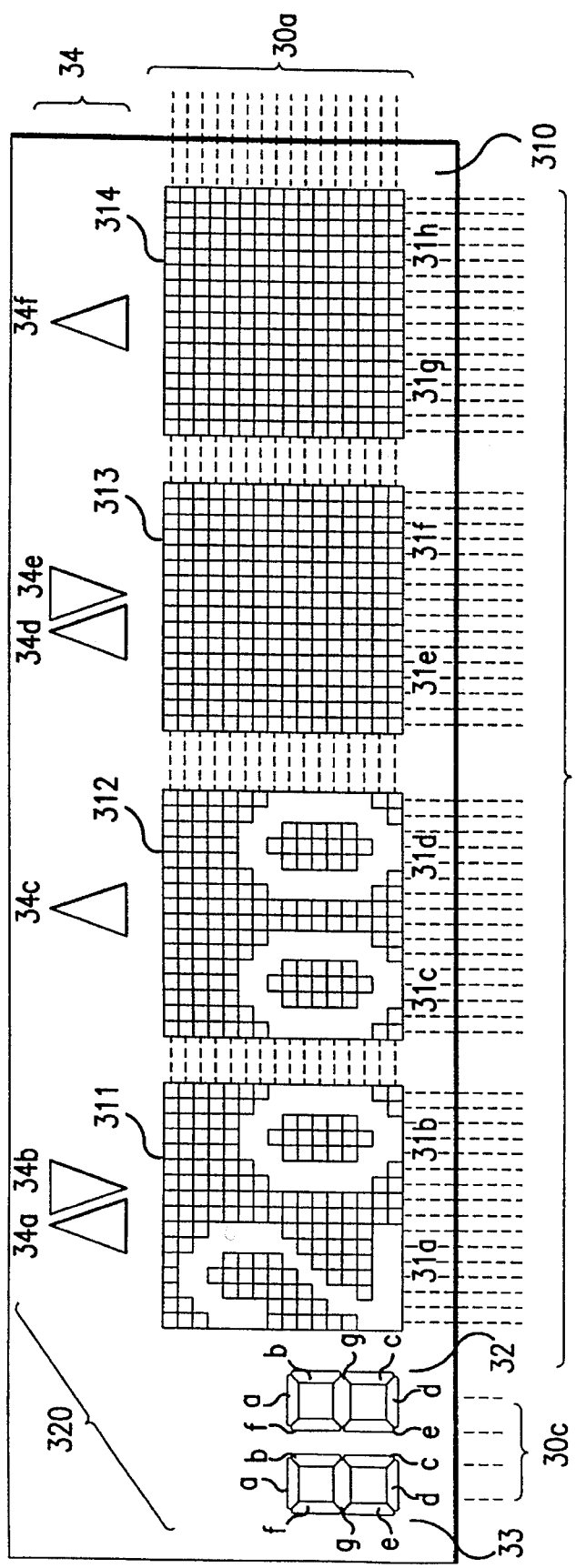
FIG. 4 is an explanatory drawing that shows an example of the structure of a display panel used with the present invention.
Figure 4B:
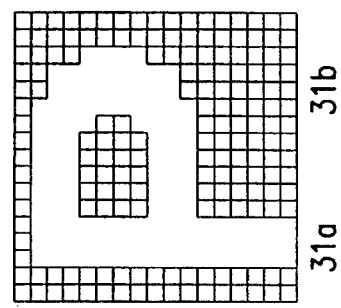

As shown in FIG. 4b, each set can, for example, em-size display a "P" in a 16×16 dot matrix. The dot matrix display component 310 has eight 16×8 units and is connected to sixteen common terminals 30a and 8×8=64 segment terminals 30b. Each display block is powered by the voltage imprinted in these terminals. Since there are sixteen common terminals 30a, a 1/16 duty cycle is carried out.

The segmented display component 320 has 7a-segment display components 32 and 33 and an auxiliary display component 34 that functions at least as an element that indicates corresponding relationships. These 7-segment display components 32 and 33 are each formed by seven segments a–g. The auxiliary display component 34 comprises six triangle-shaped segments (triangular segments) 34a–34f. Basically, the lower portions of the triangular segments 34a, 34c, 34d and 34f are facing the area adjacent the dot matrix display component 310, and are arranged in positions corresponding to the four em-size display blocks 311–314. The triangular segments 34b and 34e face in the opposite direction from triangular segments 34a–34f, and are arranged in positions corresponding to display blocks 311 and 313 and adjacent the above-mentioned triangular segments 34a and 34d.

The segmented display component 320 comprises a total of 20 segments. The common terminals are used as common terminals 30a with the dot matrix display component 310, and powered by a 1/16 duty cycle. The segment terminals suffice with a minimum of two, but may be increased to facilitate flexibility in wiring. With the present embodiment, as shown in Table 1, for example, eight COM terminals (COM0-7) may be used in common, with three segment terminals 30c (SEG64-SEG66).

TABLE 1

|       | COM7 | COM6 | COM5 | COM4 | COM3 | COM2 | COM1 | COM0 |
|-------|------|------|------|------|------|------|------|------|
| SEG64 |      | 32g  | 32f  | 32e  | 32d  | 32c  | 32b  | 32a  |
| SEG65 |      | 33g  | 33f  | 33e  | 33d  | 33c  | 33b  | 33a  |
| SEG66 |      |      | 34f  | 34e  | 34d  | 34c  | 34b  | 34a  |

In this manner, with the present embodiment, the segmented display component only differs from the dot matrix display component in shape. In other words, only the size of a single segment is different, and the display will have the same value as the dot matrix display shown in FIG. 13. In this manner, when the driving is done in common, the circuit can be simplified. When the common drive of the segmented display portion is separated from the common drive of the dot matrix component and powered independently, since the characteristics of the segmented display component can be controlled independent of the dot matrix display, there is that much more possibility that the characteristics will be improved in the duty cycle or the like. However, if one considers that even if only the characteristics of the segmented display are improved, it is pointless to do this if the characteristics of the entire display component are not improved. Likewise, if the characteristics of the dot matrix display component are improved, and there is no improvement in the characteristics of the segmented display, it is better to employ a method that uses a common drive, as with the present embodiment.

The LCD driver 20 receives a signal from the MCU 10 and can carry out a dot display on the dot matrix component 310 through an interior character generator, and at the same time the LCD driver 20 can carry out a segmented display on the segmented display component 320 according to the signal received from the MCU 10. The finder LCD 15 is directly powered through the LCD exclusive output port of the MCU 10.

Figure 3:
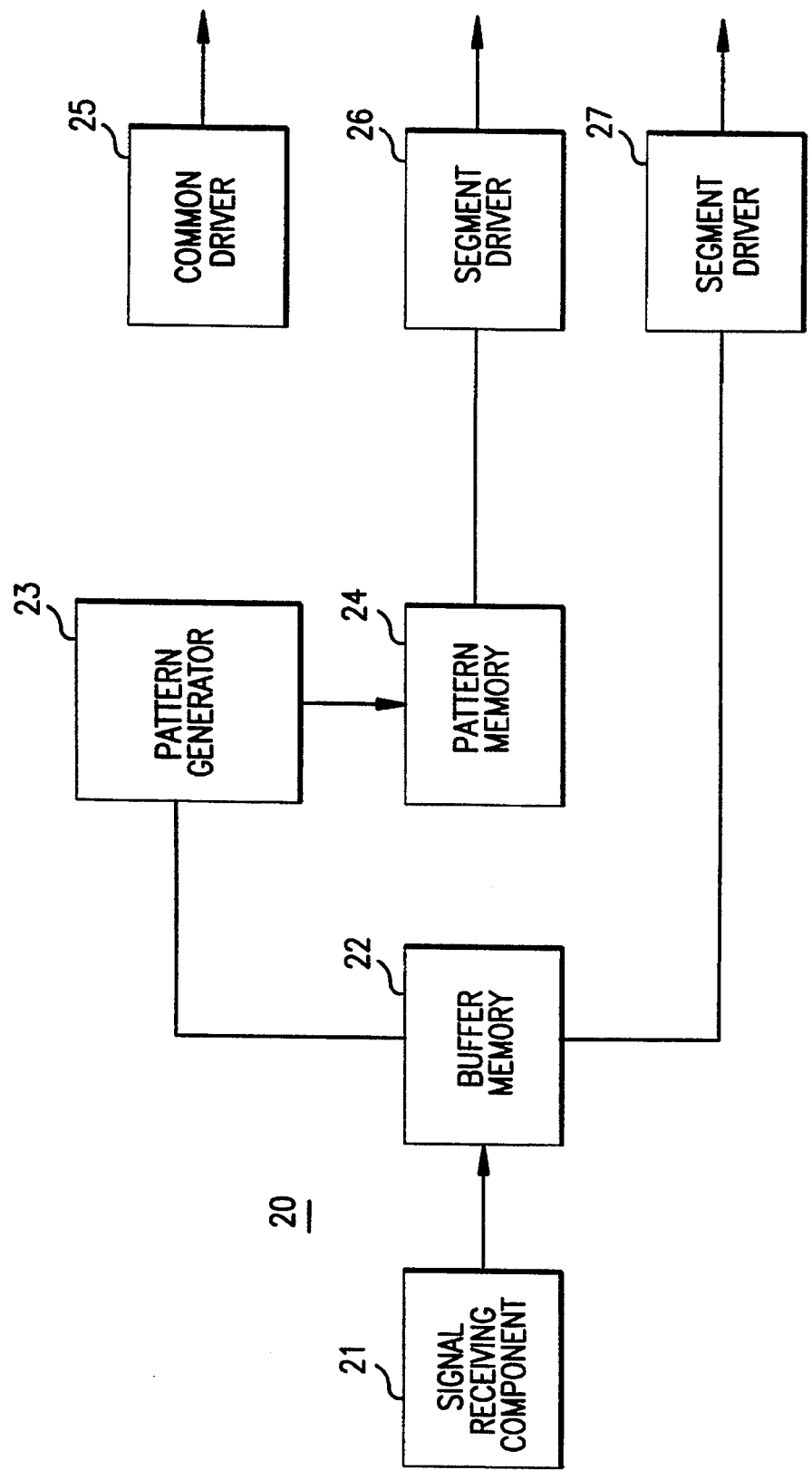
FIG. 3 is a block diagram that shows an example of the structure of a liquid crystal driver that is used on an embodiment of the present invention.

In FIG. 3, an example is shown of the structure of the LCD driver 20 used in the present embodiment. In the drawing, the LCD driver 20 comprises a signal receiving component 21, a buffer memory 22 that temporarily stores the signal data received, a pattern generator 23 that reads data commands stored in the buffer memory 22 and generates symbol patterns directed by the commands, a pattern memory 24 that records the generated patterns, a common driver 25 that drives the dot matrix display component 310 and the segmented display component 320 of the display panel 30 with a common duty, a segment driver 26 that reads the patterns stored in the pattern memory 24 and displays the patterns as dot displays, and a segment driver 27 that reads the segment display data, which is included in the data stored in the buffer memory 22, and powers the corresponding segments.

The common driver 25 powers the common signal line of the dot matrix display component 310 and the segmented display component 320 via the above-mentioned common terminal 30a. The segment driver 26 powers the dot matrix display component 310 via the segment terminal 30b, and the segment driver 27 powers the segmented display component 320 via the segment terminal 30c.

The pattern generator 23 comprises a memory (not shown) and a reading drive circuit (not shown). The display patterns (character patterns) shown in the above-mentioned FIG. 13 are stored in the memory. These patterns are prepared as icons showing the content of the selection branches and as patterns that show the content of warnings. Patterns that show numerals and characters are also included. In FIG. 13, the horizontal corresponds to the top position addresses and the vertical corresponds to the bottom position addresses. 256 (16×16) patterns are decided.

In FIG. 13, the numeral patterns at addresses "00" through "0A" and "40" through "4A" are the same as the display patterns shown in FIG. 5. However, the display position is shifted to the left and right. By preparing patterns with display positions shifted to the left and right in this manner, when multiple numerals are shown in multiple display blocks, the shift that is caused by the space between each display block is assimilated, and a well-balanced display is possible. For example, in the display "2000" shown in FIG. 4a, the characters at addresses "0A" and "4A" are both used to display the same "0." "4A" has the same shape as "0A," but is shifted one pixel to the left. As a result, a large space can be left within the display block, and a balance can be achieved between the display blocks. Thus, the spaces in the display as a whole can be made uniform.

In addition, with the present invention, numerical patterns that already contain decimal points for numerical displays are included. Therefore, separate display units for decimal points can be omitted, and the number of display units can be used more efficiently. In cases in which decimal points are included, well-balanced displays are possible. With the present embodiment, as shown by address "11," patterns are prepared wherein the numbers in the first decimal place are shorter than the regular numbers. This corresponds to the custom of indicating the numbers below the decimal point with smaller characters in the F value display of a camera.

The em-size display patterns from address "80" on forward have two of each pattern, one succeeding the other. This is to facilitate the description of the present specification. In actuality, as shown in FIG. 6a, the first block of each pattern provides the left half of the pattern and the last block provides the right half of the pattern. The two halves are joined together, and one display pattern is formed, as shown in FIG. 6b. Additionally, in FIGS. 5 and 6, the portions shown by the small dots "." are actually blank portions, but are shown as "." in order to more simply describe the dot positions. The address location for each display block unit in FIGS. 5–6 is identified below the block unit. The complete matrix is shown in FIG. 13.

The above-mentioned controlling device 10 follows a program, and comprises a central processing unit (CPU) 101 that executes the various monitoring and controlling procedures of the camera, a ROM (read only memory) 102 that records programs and various constants, a RAM (random access memory) 103 that is used for storing and calculating various data that show the condition of the camera, a clock circuit 104, and an interface circuit (I/F) 105 that carries out the input and output procedures with external circuits and the like. Programs for executing the procedures shown in the flow charts, which will be described hereafter, are stored in the ROM 102 as a part of the programs that control the actions of the camera. The central processing unit (CPU) 101 has a timer function. With the present embodiment, this timer is used in timer operations that will be described hereafter.

Switches SW1–SW9 are connected to the controlling device 10 via the input port of the interface circuit 105. As shown in FIG. 2, switches SW1–SW8 are positioned on the top surface of the body. SW1 is the power supply switch. SW2 is a switch that corresponds to the left-most position of the LCD display component and comprises a second switch that functions as the changing operation component. Switches SW3–SW6 are switches that correspond to the four display blocks 311–314, and comprise a group of switches. SW7 is a half-press switch that turns on with the first stroke of the release button, and SW8 is a release switch that turns on with the second stroke of the release button. SW9 is the rear cover switch.

As described above, the display blocks 311–314 of the dot matrix display component 310 are arranged in a horizontal row, as shown in FIGS. 2 and 4. Therefore, the first switch group of switches SW3–SW6 are arranged in a row parallel to display blocks 311–314. Switches SW3–SW6 are arranged so that the position of each corresponds to the corresponding display block. The correspondence between the icons for the selection branches displayed by display blocks 311–314 and the switches SW3–SW6 is achieved through the controlling device 10.

The triangular segments of the auxiliary display component 34 described above function as display elements for visually showing the correspondence between the selection branch icons displayed in the display blocks 311–314 and the switches SW3–SW6. Therefore, with the present embodiment, as shown in FIG. 2, the auxiliary display component 34 is positioned between the row of display blocks 311–314 and the row of switches SW3–SW6 of the first switch group.

In this position relationship, the triangular segments of the auxiliary display component 34 also function as figures that suggest direction. In other words, the photographer sees the icons displayed in the display blocks 311–314 and decides to select one of the icons, and when the photographer views the triangular segments of the auxiliary display as if they were arrows, the photographer can easily know which of the switches SW3–SW6 can be depressed.

A condition register M0 and a mode register M1 are set up in the RAM 103, which is in the controlling device 10. The contents stored in these registers is determined as shown in Tables 2 and 3.

TABLE 2

| M0 | condition register |
|---|---|
| 0 | non-selection state (display being implemented) |
| 1 | mode selection state (display selection) |

For the condition register M0, a flag is set that shows whether the picture elements (icons) displayed in the dot matrix display component 310 are a first display screen that displays the selection branches, or in other words, a mode selection state or a second display screen that displays a selected condition, or in other words, a non-selection state. In the former case, a "1" is set, and in the latter case, a "0" is set.

TABLE 3

| M1 | binary | |
|---|---|---|
| 0 | 00 | program (P) mode |
| 1 | 01 | shutter priority (S) mode |
| 2 | 10 | aperture priority (A) mode |
| 3 | 11 | manual (M) mode |

In the mode register M1, one of the four modes shown in Table 3, including the program mode (P), the shutter priority mode (S), the aperture priority mode (A), and the manual mode (M), can be preferentially set with binary numbers. This selection can be carried out in the first display screen. These selections correspond to the information input into the camera, or more specifically, to the input of the parameters that regulate the operating conditions of the camera.

There is also a release prevention register M2 and a warning register M3 in the RAM 103 inside the controlling device 10.

TABLE 4

| M2 76543210 | Release Prevention Register |
|---|---|
| xxxxxxx1 | no remaining battery capacity |
| xxxxxx1x | easy load warning |
| xxxxx1xx | rewinding in progress |

As shown in Table 4, the release prevention register M2 indicates the prevention content at each position of the 8 bits. With the present embodiment, the examples "no remaining battery capacity," "easy load warning," and "rewinding progress" are shown. Obviously, if there are other conditions for which the release should be prevented, these conditions can be assigned to any of the 8 bits. When this type of bit correspondence is established, the number of applicable subjects is limited, but the evaluation is simplified. Therefore, in cases in which there are a large number of release preventing conditions, a code should be used in place of the bit correspondence. This register stores "serious" warning conditions. That is, conditions that prevent operation of the camera.

TABLE 5

| M3 76543210 | Warning Register |
|---|---|
| xxxxxxx1 | strobe recommended |
| xxxxxx1x | camera shaking detected |
| xxxxx1xx | out of range geared for high brightness |
| xxxx1xxx | out of range geared for low brightness |
| xxx1xxxx | low battery |

As shown in Table 5, the warning register M3 indicates the warning content at each bit position of the 8 bits. With the present embodiment, the examples "strobe recommended," "camera shaking detected," "out of range geared for high brightness," "out of range geared for low brightness," and "low battery" are shown. Obviously, if there are other conditions for which warnings should be given, these conditions can be assigned to any of the 8 bits. When this type of bit correspondence is established, the number of applicable subjects is limited, but the evaluation is simplified. Therefore, in cases in which there are a large number of warning conditions, a code should be used in place of the bit correspondence.

Table 5 represents and stores "not serious" warnings that, while affecting camera operability, do not prevent operation. That is, even if, for example, a flash is recommended, a picture can still be taken. Moreover, there are times when such a photograph (without flash) is desired and the photographer wishes to ignore such a warning.

The controlling device 10 also forms a command line on the RAM 103 that serially transmits to the LCD driver 20. An example of this command line is shown in Table 6. As shown in the table, the command line comprises 11 bytes from D0 to D10. Each byte from D0 to D10 is transmitted in that order. The position of each corresponds specifically to display units 31a–31h of the dot matrix display 310 and to segments 32, 33 and 34, respectively. Display data is stored in each byte for the respective display components.

TABLE 6

| MCU data | Command | Content |
|---|---|---|
| D0 | 1st byte | display data for dot matrix - 31a |
| D1 | 2 | display data for dot matrix - 31b |
| D2 | 3 | display data for dot matrix - 31c |
| D3 | 4 | display data for dot matrix - 31d |
| D4 | 5 | display data for dot matrix - 31e |
| D5 | 6 | display data for dot matrix - 31f |
| D6 | 7 | display data for dot matrix - 31g |
| D7 | 8 | display data for dot matrix - 31h |
| D8 | 9 | data for segment display 32 |
| D9 | 10 | data for segment display 33 |
| D10 | 11 | data for segment display 34 |

Specifically, in the case of the dot matrix display data D0 through D7, memory addresses for patterns corresponding to the pattern generator 23 are recorded as D0 for display unit 31a, D1 for display unit 31b, etc.

In the case of the segmented display data D8 through D10, data that specifies which segment is to be lit among the corresponding segment display components 32, and 34 through bit correspondence is recorded. In other words, D8 illuminates segments a–g of the segmented display component 32 using bits 0–6, D9 illuminates segments a–g of the segmented display component 33 using bits 0–6, and D10 illuminates segments a–f of the segmented display component 34 using bits 0–5.

The operation of the present embodiment will next be described using the flow charts of FIGS. 7–9 and the display examples shown in FIGS. 10–13.

With the present embodiment, the controlling device 10 controls the operations of the camera. In particular, the following procedures are executed. Namely, in the above-mentioned dot matrix display component 310, a procedure is performed that displays a first display screen showing multiple selection branches in the display blocks 311–314 to carry out parameter selection and then displays a second display screen when a particular parameter has been selected and confirmed. A procedure monitors the action of each of several camera components. Another procedure causes a warning display to be shown on the display device when the result of the camera monitoring reveals a condition requiring a warning, thus indicating an appropriate warning.

With the present embodiment, if the warning relates to a condition that has been determined in advance to be a serious condition, the warning is displayed in both the first and second display screens; however, if the warning relates to a condition that is not serious, the warning is displayed only in the second display screen.

Figure 10:
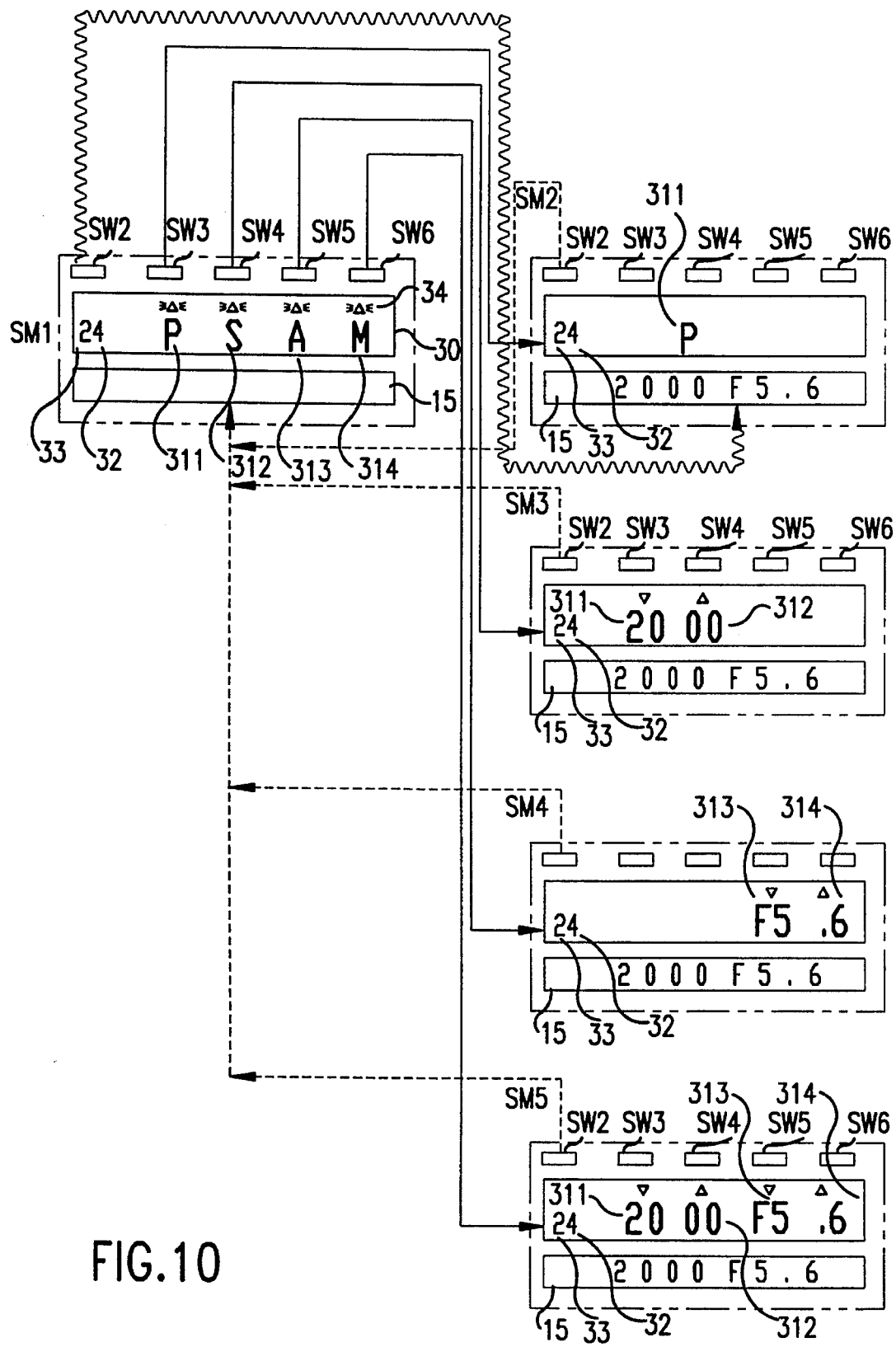
FIG. 10 is an explanatory drawing that shows the corresponding relationship of the display and the operation in the simple mode of the present embodiment.

In FIG. 10, the corresponding relationship between the display and the operation is shown. In FIG. 10, the small horizontal blocks displayed at the top of the display panel 30 show the switches SW2–6, respectively. The horizontal blocks at the bottom of the display panel 30 show the display in the finder display component 15.

In FIG. 10, display "SM1" shows the condition in which the condition register M0 shown in Table 2 is "1," or in other words, the first display screen having multiple selection branches is displayed in display blocks 311–314. In this condition, the display icons P, S, A and M, which are the symbols representing the program mode P, the shutter priority mode S, the aperture priority mode A, and the manual mode M, are each displayed in the given order in display blocks 311–314. This is a condition from which any of the icons (selection branches) can be selected. With the present embodiment, because a selection is shown, the selection is possible, and the corresponding triangular segments of the auxiliary display component 34 are turned on and off. On the segmented displays 32 and 33, two-unit numerals are displayed, and the number of film frames is displayed.

In FIG. 10, displays SM2–SM5 show respective second display screen conditions. Namely, "SM2" shows the result when P is selected. In this case, the set shutter speed and aperture value are displayed in the finder display component 15. "SM3" shows the condition in which the shutter priority mode S has been selected. In this case, the shutter speed is displayed using display blocks 311 and 312. In this condition, the shutter speed can be changed using switches SW3 and SW4. "SM4" shows the condition in which the aperture priority mode A has been selected. In this case, the aperture value is shown in display blocks 313 and 314. In this condition, the aperture value can be changed using switches SW5 and SW6. "SM5" shows the condition in which the manual mode M has been selected. In this case, the shutter speed and aperture value are displayed using display blocks 311–314. These can be changed using switches SW3–SW6.

In FIGS. 11a–j, a display example is shown of the case in which a warning is given.

Figure 11A:
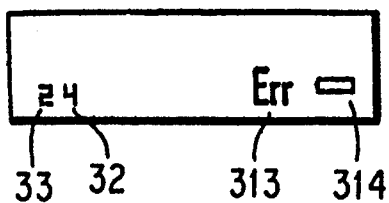
FIG. 11(a)–(h) are explanatory drawings that show examples of display conditions in the present embodiment.
Figure 11F:
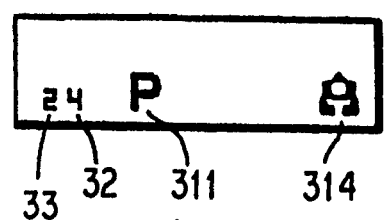
Figure 11B:
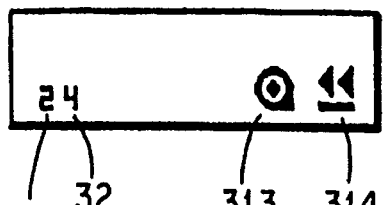
Figure 11G:
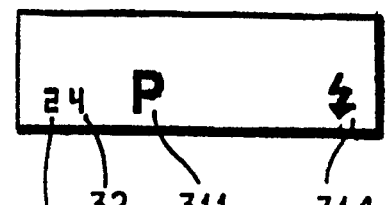
Figure 11C:
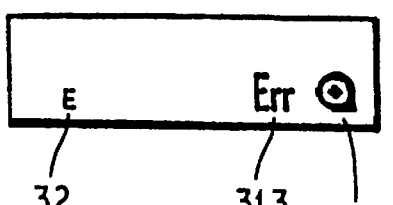
Figure 11H:
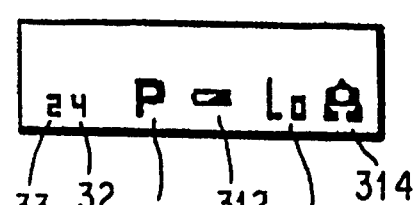
Figure 11D:
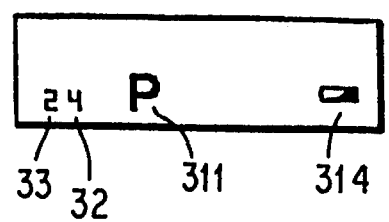
Figure 11I:
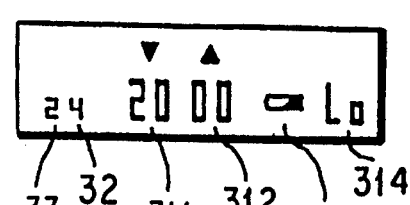
Figure 11E:
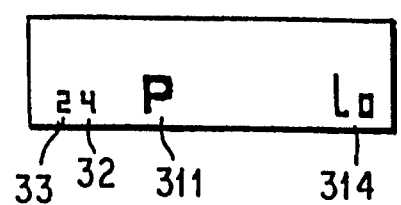
Figure 11J:
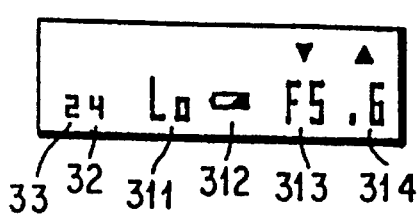

FIGS. 11a–c show examples of serious warnings that are displayed regardless of whether the selection has been carried out. These displays are displayed in the same form in all modes; namely, the other display screens are erased and only the warning is displayed. Thus, confusion with other displays is avoided, and the photographer is made aware of the seriousness of the condition.

"11a" represents the situation in which there is no battery capacity remaining, and the mark "Err" (addresses DC and DD of FIG. 13) is displayed in display block 313. In display block 314, the battery display pattern (addresses D6 and D7 of FIG. 13) is displayed. In this condition, release is prevented. "11b" illustrates the situation in which rewinding is in progress, and the pattern indicating this rewinding is read from the pattern generator 23 shown in FIG. 13 in the same manner as in condition "11a." Again, release is prevented. "11c" illustrates the case in which the film loading misses, and an "E" indicating a loading miss is displayed in the segmented display 32. Also, "Err" and an icon showing film are read from the pattern generator 23 shown in FIG. 13 and displayed in display blocks 313 and 314. Again, release is prevented.

FIGS. 11d–j show display examples of cases in which the warning is not serious, and release is not prevented.

When the above-mentioned program mode has been selected, the patterns for the icons showing warnings for low battery, outside the range geared for low brightness, camera shaking, and flash recommend are shown in display block 314 in "11d" through "11g," respectively.

"11h" shows an example in which all of these warnings are simultaneously displayed. In this case, the patterns for low battery, outside the range geared for low brightness, and camera shaking are displayed in order in display blocks 312–314. The flash recommendation is determined to be relatively insignificant, and it is excluded from the display. In other words, with the present embodiment, when multiple warnings are generated, these warnings are displayed in order in available display blocks. When there are no further display blocks available, the warnings are displayed in order of priority, with the lowest priority warnings being excluded. Thus, if the photographer makes sure to pay attention to the warnings, the content of the warnings will be easily discerned.

"11i" shows the condition in which the patterns indicating a low battery and a condition outside the range geared for low brightness are displayed in display blocks 313 and 314 in the shutter priority mode. "11j" is an example in which the patterns indicating a low battery and a condition outside the range geared for low brightness are displayed in display blocks 311 and 312 in the aperture priority mode. In these cases, too, if there are further warnings, the warnings with the lowest priority are excluded from the display.

Figure 12:
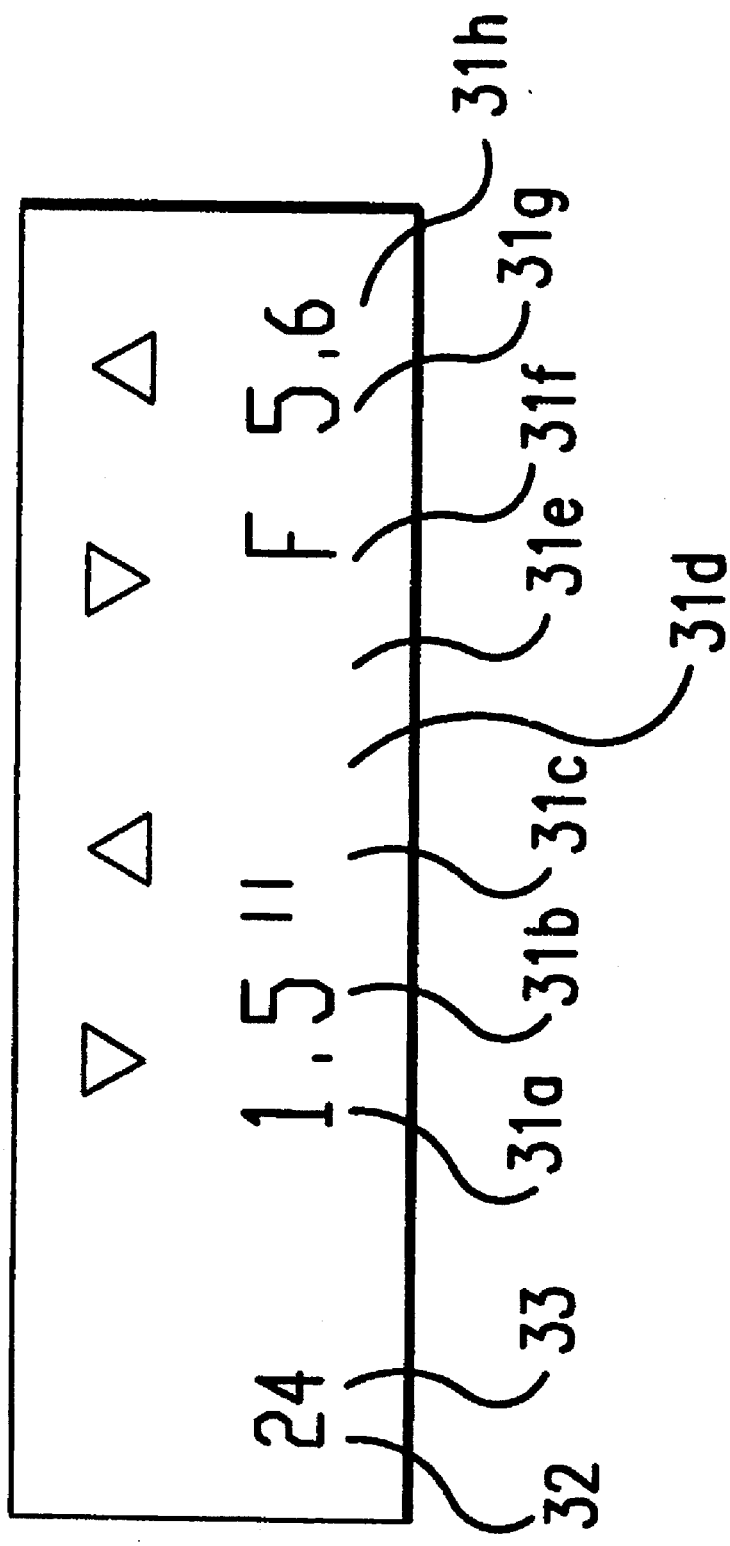
FIG. 12 is an explanatory drawing that shows another example of a display condition in the present embodiment.

FIG. 12 is another display example of the manual mode. In this example, the patterns of the following addresses of FIG. 13 are displayed in each of the display units 31a–31h: (31a–1A), (31b–05), (31c–63), (31d–20), (31e–20), (31f–26), (31g–05), and (31h–16).

Figure 7:
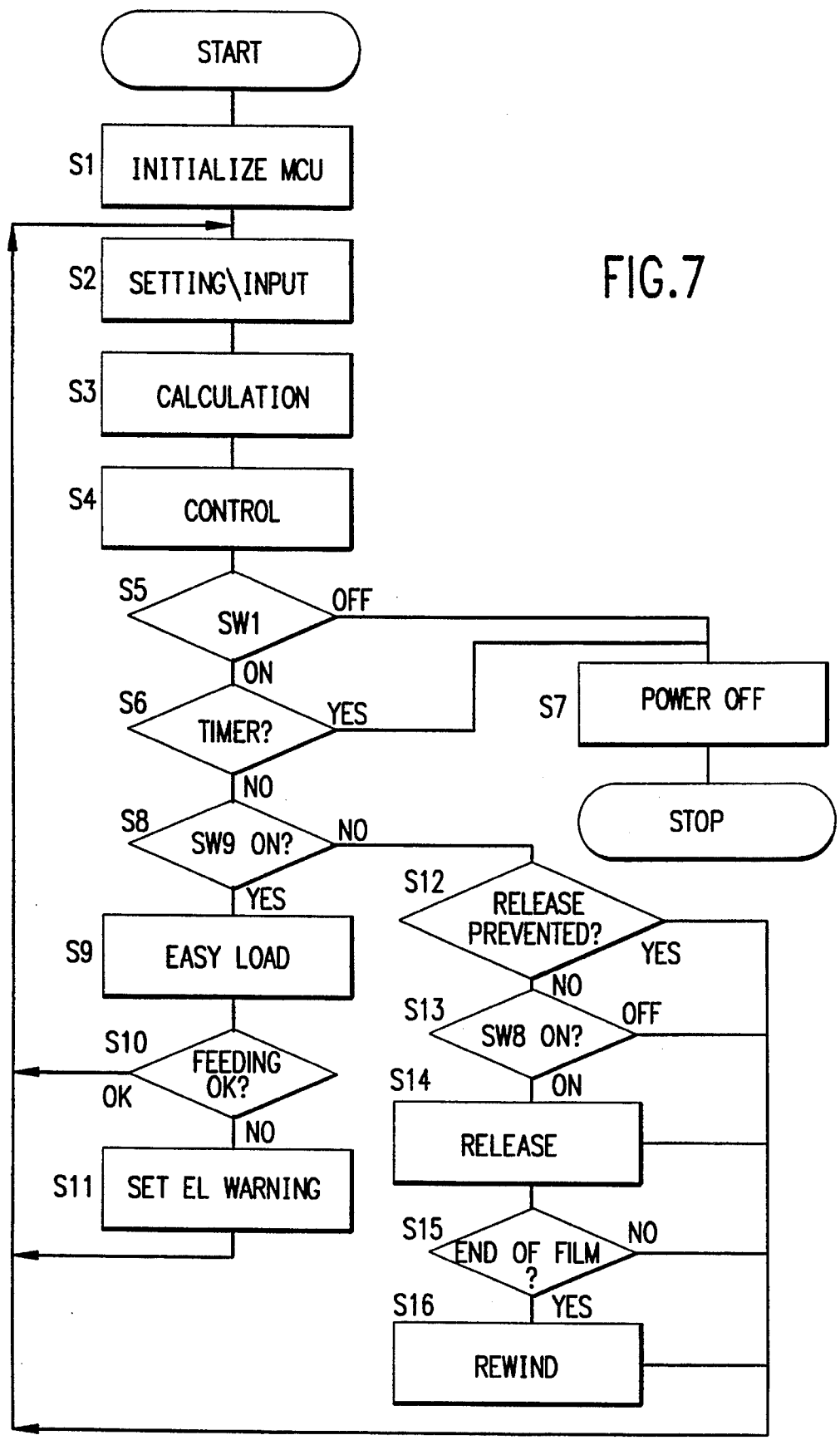
FIG. 7 is a flow chart that shows an example of the sequence of the main routine of the controlling device of the embodiment of the present invention.

First, the controlling device 10 carries out the procedure shown in FIG. 7. In other words, when SW2 or SW7 is turned on, the MCU 10 on standby (the condition in which only a minute amount of current is flowing) is interrupted and the procedure starts at step S1.

In step S1, the interior of the MCU 10 is initialized, the electric supply circuit 11 is turned on, the whole circuit receives power, the clock circuit 104 is activated, and the main clock of the MCU 10 is turned on.

In step S2, the input switch of the MCU 10 is evaluated, a setting action is carried out, and the outputs from the light measuring circuit 12 and the distance measuring circuit 13 are taken into the MCU 10. The data that has been taken in is stored in a fixed RAM 103 in the MCU 10. At this point, the battery voltage input to the electric supply circuit 11 is evaluated. If the battery voltage is less than 4.5 V, bit 0 the release prevention register M2 is set at "1," setting the "no battery capacity" warning. If the voltage is 4.5–4.8, bit 4 of the warning register M3 is set as 1, setting the "low battery" warning.

In step S3, the exposure and distance measuring calculations are carried out according to the data input condition of the RAM 103 obtained in step S2. At this point, when the input from the photo metering means 12 is at a low brightness, bit 0 of the warning register M3 is set at "1," setting the "strobe recommended" warning. If the shutter speed, determined by the mode, is less than 1/30s, bit 1 of M3 is set at "1," setting the "camera shaking" warning flag. In cases of high brightness in which the light measuring circuit exceeds the limits, or in cases in which the aperture closes but cannot close all the way even though the light measuring circuit 13 has not reached the limits and overexposure occurs even at high shutter speeds, bit 2 of M3 is set at "1," setting the "outside range geared for high brightness" warning. In cases of low brightness in which the light measuring circuit is below the limits, or in cases in which underexposure occurs even though the aperture is open and at low shutter speeds, bit 3 of M3 is set at "1," setting the "outside range geared for low brightness" warning.

In step S4, the AF regulation that controls the first motor controlling circuit 17 and the display regulation that powers the LCD driver 20 are carried out.

In step S5, a determination is made as to whether the main switch SW1 is on or off. If the switch is on, the program proceeds to step S6; if the switch is off, the program proceeds to step S7.

In step S6, it is determined whether or not the electric supply maintaining timer, which clears when it has been detected through the set input procedure of step S2 that one of the switches SW1 through SW7 is on, has exceeded a set value. If none of the switches have operated, the electric supply maintaining timer proceeds, but when the timer exceeds the set value, the MCU advances to step S7. Since the timer is cleared and does not exceed the set value when one of the switches SW2 through SW7 is operated and turned on, in this case the MCU proceeds to step S8.

In step S7, the power off procedure directed to the electric supply circuit 11 is executed. When the power off procedure is initialized, the actual power off occurs after various data evacuating procedures and procedures necessary to move the various mechanisms and components to the evacuated position have been carried out.

In step S8, it is determined whether or not the rear cover switch is activated. If the rear cover is closed, the switch is determined to be activated and the MCU proceeds to step S9. If the rear cover switch SW9 is open, or if the switch SW9 is closed but an easy load execution has been carried out, SW9 is determined to not be activated and the MCU proceeds to step S12.

In step S9, the second motor driving circuit 18 is driven and the film is wound by a fixed amount. In other words, an easy load is executed, which is an automatic loading of the film.

In step S10, the film winding amount from the easy load is evaluated. If the easy load has ended before a fixed amount of winding, the MCU advances to step S11; if the fixed amount of winding has occurred and the easy load has proceeded normally, the MCU returns to step S2 and repeats the procedure.

In step S11, since it is indicated that an error has occurred in the easy load, bit 1 of the release prevention register M2 shown in Table 4 is set to "1," setting the "easy load (EL) warning" flag. The MCU then returns to step S2.

In step S12, a determination is made as to whether or not there is a release preventing condition according to the release prevention register M2. If any of the warning flags of Table 4 have been set, M is not equal to 0. It is determined that release is impossible, and the MCU returns to step S2. Conversely, if none of the flags of Table 4 have been set, M2=0 and the MCU advances to step S13.

In step S13, a determination is made as to whether or not the release switch SW8 is on. If the switch is off, the MCU returns to step S2 and repeats the procedure; if the switch is on, the MCU advances to step S14.

In step S14, the second motor controlling circuit 18 is regulated, the exposure controlling circuit 19 is regulated, and a commonly known release procedure is carried out.

In step S15, the film feeding amount is evaluated. If the film has not been wound the length of one frame, it is determined that the end of the film has been reached and the MCU proceeds to step S16; if the film has been wound the length of one frame, the MCU returns to step S2.

In step S16, the second motor controlling circuit 18 is driven and the rewinding action is carried out. During rewinding, bit 2 of the release prevention register is set to "1," setting the "rewinding in progress" flag. When the rewinding action has been completed, the MCU returns to step S2.

When the MCU returns to step S2, the procedure described above is repeated. If a warning is necessary in the procedure described above, a display is carried out according to the warning content, as shown in FIG. 11.

Figure 8:
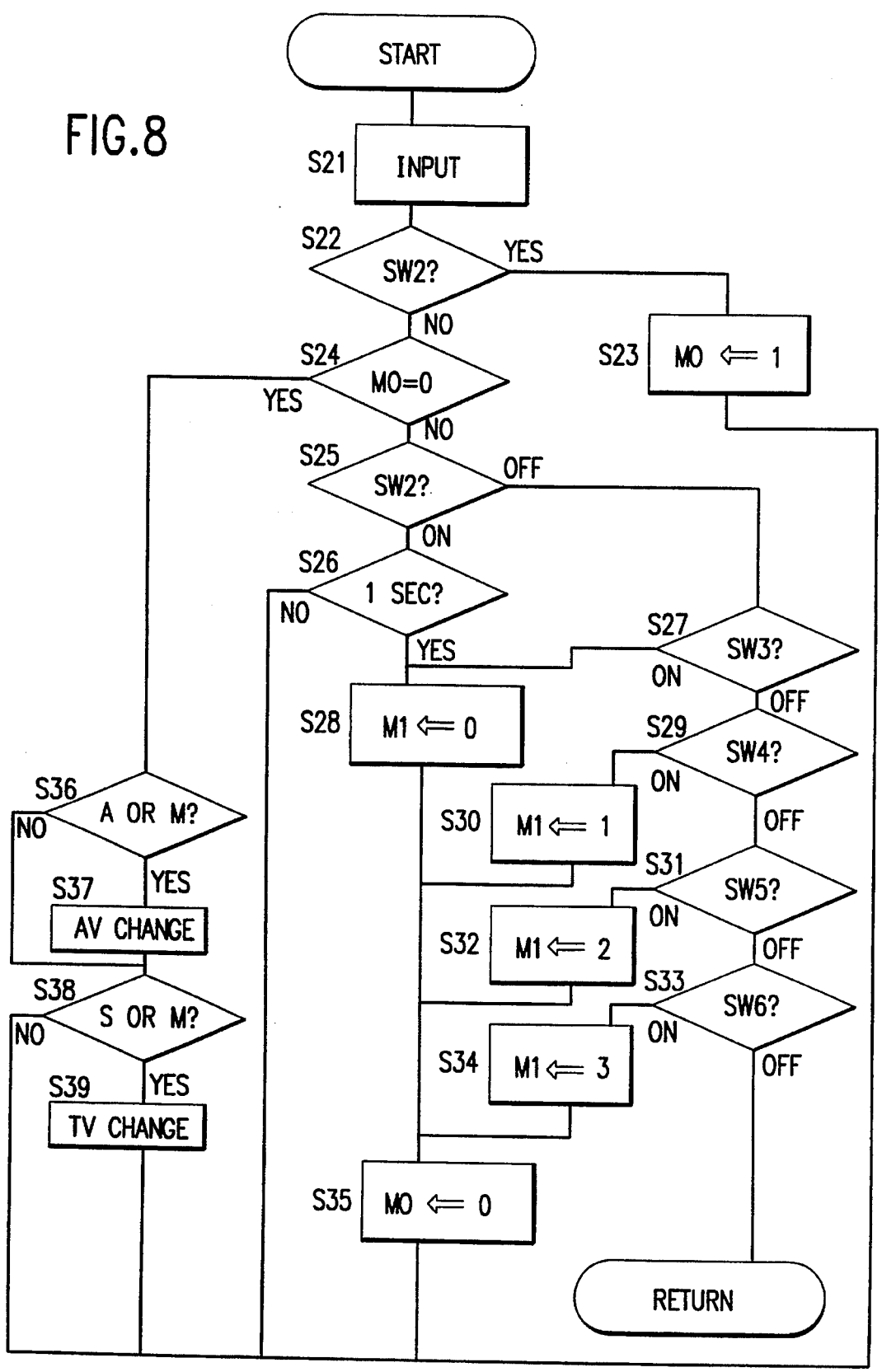
FIG. 8 is a flow chart that shows an example of a subroutine that is called in the setting procedure of the above-mentioned main routine.

FIG. 8 is a portion of the setting routine, which is called as a subroutine when step S2 in FIG. 7 is carried out. Through the individual selections, according to the selection content, the display changes from "SM1" shown in FIG. 10 to "SM2," "SM3," or "SM4" shown in the same figure.

In step S21, input is received from SW2–SW7. If any of the switches are on, the electric supply maintaining timer evaluated in step S6 of FIG. 7 is cleared.

In step S22, the state of SW2 is evaluated. If the switch has barely been turned on, the MCU proceeds to step S23; if SW2 is off or if SW2 is on but is still being depressed, the MCU advances to step S24.

In step S23, the condition register M0 is set to "1," the selection condition is set, and the MCU returns.

In step S24, a determination is made as to whether the condition register M0 is "0". If M0 is "0" since this is a non-selection condition, the MCU advances to step S36. If the condition is a selection condition and M0=1, the MCU proceeds to step S25.

In step S25, a determination is made as to whether or not SW2 is on or off. If SW2 is on, the MCU proceeds to step S26; if SW2 is off, the MCU proceeds to step S27. At this point, in step S26, a determination is made as to whether SW2 has been on for more than one second. If SW2 has been depressed for more than one second, the MCU proceeds to step S28; if SW2 has not been depressed for more than one second, the MCU returns.

In step S27, a determination is made as to whether SW3 is on or off. If SW3 is on, the MCU proceeds to step S28; if SW3 is off, the MCU proceeds to step S29. In step S28, the mode register M1 is set to "0," setting the program (P) mode. The MCU then proceeds to step S35.

In step S29, a determination is made as to whether SW4 is on or off. If SW4 is on, the MCU proceeds to step S30; if SW4 is off, the MCU proceeds to step S31. In step S30, the mode register M1 is set to "1," setting the shutter priority (S) mode. The MCU then proceeds to step S35.

In step S31, a determination is made as to whether SW5 is on or off. If SW5 is on, the MCU proceeds to step S32; if SW5 is off, the MCU proceeds to step S33. In step S32, the mode register M1 is set to "2," setting the aperture priority (A) mode. The MCU then proceeds to step S35.

In step S33, a determination is made as to whether SW6 is on or off. If SW6 is on, the MCU proceeds to step S34; if SW6 is off, the MCU returns. In step S34, the mode register M1 is set to "3," setting the manual (M) mode. The MCU then proceeds to step S35.

In step S35, the condition register M0 is set to "0" and the MCU returns.

In step S36, a determination is made as to whether the camera is in the A (aperture priority) mode or the M (manual) mode. In the case of the A mode (M1=2) or M mode (M1=3), the MCU proceeds to step S37 because bit 1 of the mode register M1 is set to "1." Conversely, in the case of the P mode (M1=0) or S mode (M1=1), the MCU proceeds to step S38 because bit 1 of the mode register M1 is set to "0."

In step S37, the AV value is changed. Specifically, the aperture value (AV) setting is decreased one step down count by the activation of the switch SW5, or is increased one step up count by the activation of SW6.

In step S38, a determination is made as to whether the camera is in the S mode or the M mode. In the case of the S mode (M1=1) or the M mode (M1=3), the MCU proceeds to step S39 because bit 0 of the mode register M1 is set to "1." Conversely, in the case of the P mode (M1=0) or the A mode (M1=2), the MCU returns because bit 0 of the mode register M1 is set to "0."

In step S39, the TV value is changed. Specifically, the shutter speed (TV) setting is decreased one step down count by the activation of SW3, or is increased one step up count by the activation of SW4.

With all of these cases, displays are carried out on the display panel 30 as shown in "SM3," "SM4," and "SM5" of FIG. 10. On the auxiliary display component 34, the up counts and down counts are indicated by the orientation of the triangle shape of the triangular shaped segments. Thus the photographer can easily set the numerical values.

Figure 9:
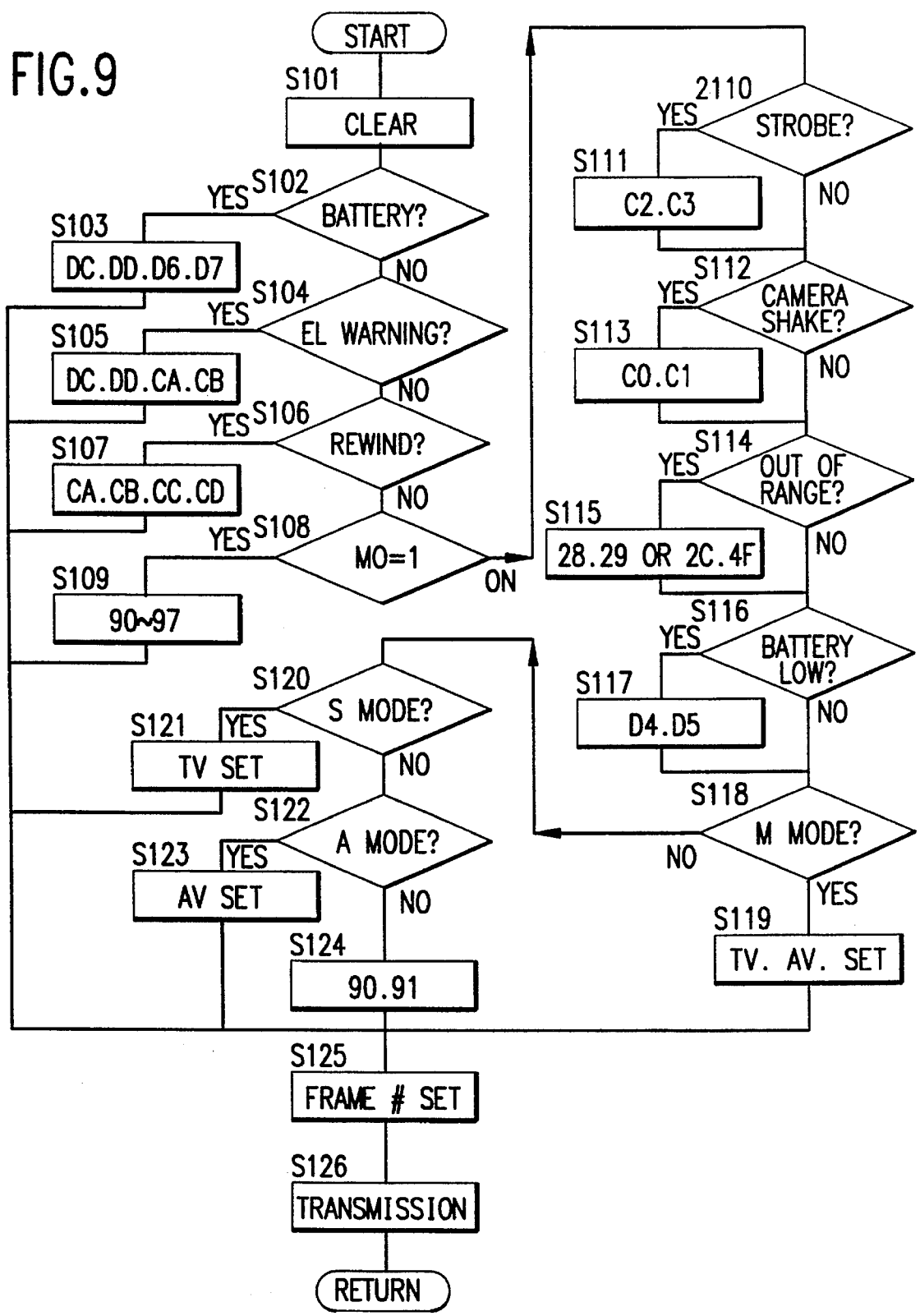
FIG. 9 is a flow chart that shows an example of a subroutine that is called in the setting procedure of the above-mentioned main routine.

FIG. 9 is a flow chart showing the display routine of the MCU 10. This routine is called as a subroutine when step S4 of FIG. 7 is carried out.

In step S101, the data regions D0–D10 of the command line that is transmitted to the LCD driver 20 are cleared. At this point, address 20, which is a blank display, is set in D0–D7. "0" is set in D8–D10 to clear the display.

In step S102, bit 0 of the release prevention register M2 is evaluated. If bit 0 is "1" (the no remaining battery capacity warning), the MCU advances to S103; if bit 0 is "0," the MCU advances to S104.

In step S103, addresses DC, DD, D6 and D7 of FIG. 13 are set as data in the transmitting data regions D4–D7 so that the no battery warning can be displayed. The MCU then proceeds to step S125.

In step S104, bit 1 of M2 is evaluated. If bit 1 is "1" (the easy load warning), the MCU advances to step S105; if bit 1 is "0," the MCU advances to step S106

In step S105, addresses DC, DD, CA and CB of FIG. 13 are set as data in the transmitting data regions D4–D7 so that the easy load warning can be displayed. The MCU then proceeds to step S125.

In step S106, bit 2 of M2 is evaluated. If bit 2 is "1" (rewinding in progress), the MCU proceeds to step S107; if bit 2 is "0," the MCU proceeds to step S108.

In step S107, addresses CA, CB, CC, and CD of FIG. 13 are set as data in the transmitting data regions D4–D7 so that the rewinding in progress display can be carried out. The MCU then proceeds to step S125.

In step S108, the condition register M0 is evaluated. If M0 is "1" (the selection condition), the MCU proceeds to S109; if M0 is "0" (the non-selection condition), the MCU proceeds to step S110.

In step S109, addresses 90–97 of FIG. 13 are set in the data regions D0–D7 so that the em-size displays P, S, A and M can be carried out. In order to display triangles, which are the patterns that correspond to the four em-size displays and show the triangular segments, the binary numbers "101101" are set in the data region D10 according to Table 1 to correspond to segmented display components 34 fdca. When the MCU proceeds to step S109, the illuminated and unlit conditions of the display are alternated by setting the binary numbers "000000," resulting in a blinking display. In this condition, the display field "SM1" shown in FIG. 10 is displayed in the dot matrix display 310. The MCU then proceeds to step S125.

In step S110, bit 0 of the warning register M3 is evaluated. If bit 0 is "1" (strobe recommended), the MCU proceeds to step S111; if bit 0 is "0," the MCU proceeds to step S112.

In step S111, C2 and C3 of FIG. 13 are set as data in the transmitting data regions D0 and D1 so that the strobe recommended display can be carried out. The MCU then proceeds to step S112.

In step S112, bit 1 of M3 is evaluated. If bit 1 is "1" (camera shaking), the MCU proceeds to step S113; if bit is "0," the MCU proceeds to step S114.

In step S113, the data stored in data regions D0–D7 is two-byte shifted. In other words, the data of D0 and D1 are shifted to D2 and D3. C0 and C1 of FIG. 13 are set as data in the transmitting data regions D0 and D1 so that the camera shaking display can be carried out. The MCU then proceeds to step S114.

In step S114, bits 2 and 3 of M3 are evaluated. If either bit is "1" (the out of geared range warning), the MCU proceeds to step S115; if the bits are both "0," the program proceeds to step S116.

In step S115, the data stored in data regions D0–D7 is two-byte shifted. If bit 2 of M3 is "1," indicating outside the range geared for high brightness, 28 and 29 of FIG. 13 are set as data in transmitting data regions D0 and D1 so that the "Lo" display can be carried out. The MCU then proceeds to step S116.

In step S116, bit 4 of M3 is evaluated. If bit 4 is "1" (the low battery warning), the MCU proceeds to step S117; if bit 4 is "0," the MCU proceeds to step S118.

In step S117, the data stored in data regions D0–D7 is two-byte shifted. D4 and D5 of FIG. 13 are set as data in transmitting data regions D0 and D1 so that the low battery display can be carried out. The MCU then proceeds to step S118.

In step S118, a determination is made as to whether or not the mode register M1 is "3." If M1 is "3" (the M mode), the MCU proceeds to step S119. Otherwise, the MCU proceeds to step S120.

In step S119, the set TV value and the set AV value are set in the data regions D0–D7. For example, if an F5.6 of 2000 is set, 42, 0A, 4A, 0A, 26, 05, 16 and 20 of FIG. 13 are set in D0–D7. At this point, since 8 bytes of data are freshly set, the display set in steps S110 to S117 are all ignored. In addition, since TV values and AV values can be set in the M mode, binary numbers "110110" are set in D10 according to Table 1, making it possible to light the segment display 34 fecb.

When "2000" is displayed, both "0A" and "4A" are both used to display the same "0." This is because, as shown in FIG. 4a, on a display that mixes an em-size display and an en-size display, which is one-half of an em-size display, the spacing of each character is essentially the same. The shift due to the space between the display blocks is absorbed, and the method of dividing the characters can produce an attractive balance. "4A" has the same shape as "0A," but is shifted one pixel to the left. The spaces in the resulting display condition can be made uniform.

In step S120, a determination is made as to whether or not the mode register M1 is "1." If M1 is "1" (mode S), the MCU proceeds to step S121. Otherwise, the MCU proceeds to step S122.

In step S121, the data stored in data regions D0–D7 is four-byte shifted, and the set TV value is set in data regions D0–D3. For example, if "2000" has been set, 42, 0A, 4A and 0A of FIG. 13 are set in D0–D3. At this point, since the data previously set in D4–D7 is freshly set by the four-byte shift, the display set in steps S110 to S113 can be ignored in the set conditions of steps S114–S117. Obviously, if there is no warning condition, only the shutter speed display will be carried out. Also, since the TB value can be set in the S mode, binary numbers "000110" are set in D10 according to Table 1, making it possible to light the segmented display 34bc.

In step S122, a determination is made as to whether the mode register M1 is "2." If M1 is "2" (the A mode), the MCU proceeds to 123. Otherwise (the P mode), the MCU proceeds to step S124.

In step S123, the set AV value is set in data regions D4–D7. For example, if F5.6 is set, 26, 05, 16 and 20 are set in D4–D7, according to FIG. 13. At this point, since the 4 bytes of data initially set in D4–D7 are freshly set, the display set in steps S110–S113 can be ignored throughout the set conditions of steps S114–S117. Obviously, if there are no warning conditions, the display of the diaphragm value alone can be carried out. In addition, since the AV value can be set in the A mode, the binary numbers "110000" are set in D10 according to Table 1, making it possible to light the segmented display 34fe.

In step S124, the data stored in data regions D0–D7 is two-byte shifted, and 90 and 91 are set in data regions DO and D1 to display a "P" in the dot LCD display component 31ab. If there are no warning conditions, only the "P" display is carried out. At this point, since the two-byte data initially set in D6–D7 are ignored, the content set in step S111 can be displayed in each case that has been set in steps S112 to S117. Since neither the TV value nor the AV value can be set in the P mode, binary numbers "000000" are set in D10, and the segmented display 34 is turned off.

In step S125, the frame number data is set in D8 and D9. To display "24," binary numbers "1100110" are set in D8 to light the segmented display 32gfcb, and binary numbers "1011011" are set in D9 to light the segmented display 33gedba.

In step S126, the data of D0–D10 set in steps S101–S125 is transmitted to the LCD driver 20, and the display can be carried out on the display panel 30.

As described above, with the present embodiment, since a dot matrix display component is used and characters and figures (icons) can be displayed, the photographer can clearly discern the content of the selected input for the operating parameters of the camera. Since the display can be carried out by switches arranged in a line that correspond to multiple display blocks, the parameter selection can be reliably carried out without mistaking the corresponding relationships. Furthermore, with the present embodiment, the information relating to the parameters necessary for setting can be easily seen, and the setting input operations for these parameters can be easily carried out.

Even if the photographer is inexperienced, a user friendly camera is provided on which the parameters can easily be set. The setting of numerical values for the shutter speed, aperture, and the like can also be easily carried out. In doing so, an up count or down count can be determined through the figures on the auxiliary display component that indicate the direction (namely, the triangular segments).

When numerical values are displayed, the number of display units used to display patterns including decimal points is reduced. The position of number patterns is determined under consideration of the space in the actual positioned condition. Therefore, numerical values can be displayed in multiple units with a good balance.

When the present embodiment detects a condition that requires a warning when monitoring the camera, the MCU displays the content of the appropriate warning on the above-mentioned display device. If the warning concerns a condition that has been determined in advance to be serious, the warning can be displayed in both the first and second display screens. If the warning concerns a condition that is not serious, the warning can be displayed in only the second display screen. Thus, the photographer can immediately and clearly distinguish between conditions that require immediate attention and conditions that do not require immediate attention.

According to the present invention, warnings of serious content and warnings of relatively insignificant content are organized and displayed. The content of these warnings can be easily comprehended, even if the photographer is inexperienced. By changing the display conditions according to whether the warning content is serious, the warnings can be displayed in a manner that hinders the photography of the photographer as little as possible.

The invention has been described with reference to preferred embodiments thereof, which are illustrative and not limiting. Various changes may be made without departing from the spirit and scope of the invention as defined in the appended claims. For example, with the present embodiment, an example of an exposure mode was shown, but this does not limit the present invention. The present invention can also apply to selection inputs for setting parameters relating to other operations. In this case, the modes are set in the mode register, which indicates the contents of these other operations. As such, if auto-focus is to be carried out in one of the multiple areas, when one area is to be selected from among the multiple areas, there are automatic determining methods, methods that determine by detecting the line of vision, and methods by which the area is determined manually. The present invention can apply to these selected inputs.

What is claimed is:

1. A camera equipped with a warning function that can select and display a target parameter from among multiple parameters that have been prepared in advance, comprising:

a display device with a dot matrix display component capable of displaying a first display screen showing multiple selection branches used for parameter selection, displaying a second display screen when a particular parameter has been selected and confirmed, and displaying a warning display indicative of an appropriate warning; and a controller that controls the action of the camera including monitoring of each of several camera components and determination of serious and not serious warning conditions;

wherein when the result of the camera monitoring reveals a condition that requires a warning, the controller controls display of the warning display in both the first and second display screens if the warning relates to a condition that has been determined in advance to be a serious condition, the warning display being displayed only in the second display screen if the warning relates to a condition that is not serious.

2. The camera equipped with a warning function according to claim 1, wherein the dot matrix display component has multiple display blocks.

3. The camera equipped with a warning function according to claim 2, wherein the multiple display blocks are aligned horizontally in a row.

4. The camera equipped with a warning function according to claim 3, wherein the multiple display blocks each comprise a pair of display block units.

5. The camera equipped with a warning function according to claim 4, wherein the controlling device causes the second display screen to be displayed on one or more display block units of the dot matrix display component.

6. The camera equipped with a warning function according to claim 4, wherein the controlling device controls display of icons that indicate which parameters may be selected as selection branches in each display block of the dot matrix display component for the first display screen and controls display of an icon for the selected parameter in one of the display blocks for the second display screen.

7. The camera equipped with a warning function according to claim 6, wherein the controlling device controls display of an appropriate warning icon using a display block that is not used in the second display screen when the condition for which the warning is displayed is not serious.

8. The camera equipped with a warning function according to claim 2, wherein the controlling device causes the first display to display selection branches, used for parameter selection, on the display block units of the dot matrix display component and causes the second display screen to display on the display block units when the parameter has been selected and confirmed.

9. The camera equipped with a warning function according to claim 2, further comprising a register for storing revealed warning conditions.

10. The camera equipped with a warning function according to claim 1, wherein the controlling device has a memory component that records character patterns for displaying icons in the display device for parameters that may be selected and icons in the display device for displaying warnings.

11. The camera equipped with a warning function according to claim 1, wherein a serious condition is a condition in which it is necessary to stop activation of a release button.

12. The camera of claim 11, wherein when a serious warning condition is revealed, the controlling device replaces the first display screen and the second display screen with a serious warning display icon.

13. A display method for a camera equipped with a warning function that can select and display a target parameter from among multiple parameters that have been prepared in advance, the camera comprising a display device with a dot matrix display component and a controlling device for controlling the action of the camera, the method comprising the steps of:

(1) displaying a first display screen on the dot matrix display component of the display device showing multiple selection branches used for parameter selection;

(2) displaying a second display screen on the dot matrix display component of the display device when a particular parameter has been selected and confirmed;

(3) monitoring the action of each of several camera components; and (4) causing a warning display to be displayed on the dot matrix display component of the display device indicating an appropriate warning when the result of the camera monitoring reveals a condition that requires a warning, the warning being displayed in both the first and second display screens if the warning relates to a condition that has been determined in advance to be a serious condition, the warning being displayed only in the second display screen if the warning relates to a condition that is not serious.

14. The method of claim 13, wherein the dot matrix display component comprises multiple display blocks and the controlling device controls display of the first display screen, second display screen and warning display on one or more of the display blocks of the dot matrix display component.

15. The display method of claim 14, wherein if multiple warning conditions are revealed, step (4) includes displaying each of the multiple warning conditions on display blocks not being used.

16. The display method of claim 14, wherein if more warning conditions are revealed than an available number of unused display blocks, the method further comprises prioritizing the warnings and filling the available unused display blocks with warnings according to the given priority.

17. The display method of claim 14, wherein step (1) includes displaying selection branches used for parameter selection in the first display screen on the display blocks of the dot matrix display component and step (2) includes displaying the second display screen on the display blocks when a particular parameter has been selected and confirmed.

18. The display method of claim 14, wherein step (4) includes displaying an appropriate warning icon using at least one of the display blocks that is not used in the second display screen when the condition for which the warning is displayed is not serious.

19. The display method of claim 14, further comprising the steps of clearing the first display screen and the second display screen and replacing the cleared first display screen and second display screen with the warning display when the warning condition is serious.

20. The display method of claim 14, further comprising the step of determining a serious warning condition when the warning condition necessitates stop of camera release.

21. The display method of claim 14, wherein the controlling device has a memory component, the method comprising recording in the memory component character patterns for display as icons for the first display screen, second display screen and warning display.

22. The display method of claim 14, wherein step (2) includes displaying the second display screen on one display block of the dot matrix display component.

23. The display method of claim 14, wherein step (2) includes displaying warnings on the display device for conditions that are not serious using display blocks that are not used in the second display screen, leaving the second display screen visible.

24. The display method of claim 14, wherein step (1) includes displaying icons, indicating parameters that may be selected as selection branches, in each display block of the dot matrix display component for the first display screen and step (2) includes displaying an icon for the selected parameter in one of the display blocks for the second display screen.

25. The display method of claim 24, further comprising the step of displaying setting information relating to the selected parameter on the second display screen.

26. A camera equipped with a warning function that can select and display a target parameter from among multiple parameters that have been prepared in advance, the camera comprising:

a display device with a dot matrix display component; and a controlling device for controlling the action of the camera;

wherein the controlling device includes:

(1) display means for display of a first display on the display device showing multiple selection branches used for parameter selection, and display of a second display on the display device when a particular parameter has been selected and confirmed;

(2) monitoring means for monitoring each of several camera components; and (3) warning display means for display of a warning display on the display device indicating an appropriate warning when the result of the camera monitoring reveals a condition that requires a warning, the warning being displayed in both the first and second displays if the warning relates to a condition that has been determined in advance to be a serious condition, the warning being displayed only in the second display if the warning relates to a condition that is not serious.

27. The camera equipped with a warning function according to claim 26, wherein the dot matrix display component has multiple display blocks, each display block comprising a pair of display block units, the controlling device causing the first display to display selection branches, used for parameter selection, on the display block units of the dot matrix display component and causes the second display to display on the display block units when the parameter has been selected and confirmed.

28. The camera equipped with a warning function according to claim 26, wherein a serious condition is a condition in which it is necessary to stop activation of a release button.

29. The camera equipped with a warning function according to claim 26, wherein when a serious warning condition is revealed, the controlling device replaces the first display and the second display with a serious warning display icon.

30. The camera equipped with a warning function according to claim 26, wherein the controlling device has a memory component that records character patterns for displaying icons in the display device for parameters that may be selected and icons in the display device for displaying warnings.

* * * * *